United States Patent
Terado

(10) Patent No.: US 10,763,462 B2
(45) Date of Patent: *Sep. 1, 2020

(54) SECONDARY BATTERY

(71) Applicant: ENVISION AESC JAPAN LTD., Zama-shi (JP)

(72) Inventor: Miyuki Terado, Yokohama (JP)

(73) Assignee: ENVISION AESC JAPAN LTD., Zama-shi (JP)

( * ) Notice: Subject to any disclaimer, the term of this patent is extended or adjusted under 35 U.S.C. 154(b) by 118 days.

This patent is subject to a terminal disclaimer.

(21) Appl. No.: 14/184,289

(22) Filed: Feb. 19, 2014

(65) Prior Publication Data
US 2014/0170469 A1 Jun. 19, 2014

Related U.S. Application Data

(62) Division of application No. 13/885,572, filed as application No. PCT/JP2011/072985 on Oct. 5, 2011.

(30) Foreign Application Priority Data

Nov. 18, 2010 (JP) ................................ 2010-258365
Aug. 26, 2011 (JP) ................................ 2011-185051

(51) Int. Cl.
   H01M 2/02 (2006.01)
   H01M 2/10 (2006.01)
   (Continued)

(52) U.S. Cl.
   CPC ......... *H01M 2/024* (2013.01); *H01M 2/0245* (2013.01); *H01M 2/1077* (2013.01); *H01M 2/362* (2013.01); *H01M 10/04* (2013.01)

(58) Field of Classification Search
   CPC ..................................................... H01M 2/36
   See application file for complete search history.

(56) References Cited

U.S. PATENT DOCUMENTS

| 4,070,528 A | 1/1978 | Bergum et al. | |
|---|---|---|---|
| 2007/0117008 A1* | 5/2007 | Kaneko ............... | H01M 2/1653 429/152 |
| 2011/0195298 A1* | 8/2011 | Daidoji ............... | H01M 2/0207 429/153 |

FOREIGN PATENT DOCUMENTS

| JP | 63-86268 A | 4/1988 |
|---|---|---|
| JP | 06-036801 A | 2/1994 |

(Continued)

OTHER PUBLICATIONS

JP 2007287724 A Translation from Espacenet.*
(Continued)

*Primary Examiner* — Barbara L Gilliam
*Assistant Examiner* — Nathanael T Zemui
(74) *Attorney, Agent, or Firm* — Foley & Lardner LLP

(57) ABSTRACT

The present invention relates to a secondary battery in which a stacked electrode assembly having a cathode, an anode and a separator is accommodated together with an electrolytic solution between exterior members. In the present invention, the secondary battery has a plurality of joint parts at which the outer peripheral portion of the separator is joined with the exterior members and a holding part formed at least between the joint parts so as to hold therein the electrolytic solution, wherein a sum of perimeters of the joint parts is longer than a perimeter of a rectangle of minimum area enclosing therein all of the joint parts. In this configuration, it is possible to refill the stacked electrode assembly with the electrolytic solution and protect the joint parts from breakage while preventing displacement of the stacked electrode assembly in the secondary battery.

4 Claims, 12 Drawing Sheets

(51) Int. Cl.
   *H01M 2/36*   (2006.01)
   *H01M 10/04*  (2006.01)

(56) References Cited

FOREIGN PATENT DOCUMENTS

| | | | |
|---|---|---|---|
| JP | 10188938 A | * | 7/1998 |
| JP | 11-250873 A | | 9/1999 |
| JP | 2002-252036 A | | 9/2002 |
| JP | 2003-92092 A | | 3/2003 |
| JP | 2007-250319 A | | 9/2007 |
| JP | 2007287724 A | * | 11/2007 |
| JP | 2007311323 A | * | 11/2007 |
| JP | 2008-84666 A | | 4/2008 |
| JP | 2010-27368 A | | 2/2010 |
| JP | 2010-153140 A | | 7/2010 |
| WO | WO 2010026774 A1 | * | 3/2010 .......... H01M 2/0207 |

OTHER PUBLICATIONS

JP2007311323A Translation from Espacenet.*
JPH10188938A Original and Translation from Espacenet (Year: 1998).*
European Search Report dated Feb. 3, 2014 (6 pgs.).
Supplementary European Search Report dated Mar. 12, 2014 (6 pgs.).
M. Terado, USPTO Final Office Action U.S. Appl. No. 13/885,572 dated Oct. 1, 2015, 9 pgs.
M. Terado, U.S. PTO Office Action U.S. Appl. No. 13/885,572 dated Mar. 3, 2016, 11 pgs.
USPTO Office Action, U.S. Appl. No. 13/885,572, dated Sep. 9, 2016, 10 pages.
USPTO Office Action, U.S. Appl. No. 13/885,572, dated Apr. 21, 2017, 9 pages.
USPTO Office Action, U.S. Appl. No. 13/885,572, dated Oct. 19, 2017, 9 pages.
USPTO Office Action, U.S. Appl. No. 13/885,572, dated Mar. 4, 2019, 10 pages.
USPTO Office Action, U.S. Appl. No. 13/885,572 dated Sep. 19, 2019, 9 pages.
Notice of Allowance, U.S. Appl. No. 13/885,572, dated Apr. 23, 2020, 9 pages.

* cited by examiner (A)

(B)

(A)

(B)

(A)

(B)

(C)

SECONDARY BATTERY

CROSS-REFERENCE TO RELATED PATENT APPLICATIONS

This application is a divisional application of U.S. application Ser. No. 13/885,572 filed May 15, 2013, which is the National Stage Application of International Application No. PCT/JP2011/072985, filed Oct. 5, 2011, which claims priority to Japanese Patent Application Nos. 2010-258365 filed Nov. 18, 2010 and 2011-185051 filed Aug. 26, 2011, the entire contents of all are incorporated herein by reference.

FIELD OF THE INVENTION

The present invention relates to a secondary battery.

BACKGROUND ART

Provided is a high-output and/or high-capacity battery module in which a plurality of flat batteries having electrodes led out of exterior members are stacked and electrically connected in series and/or parallel to each other.

One example of flat battery usable in the battery module is a non-aqueous electrolyte secondary battery. The non-aqueous electrolyte secondary battery is a battery in which a stacked electrode assembly is accommodated together with a non-aqueous electrolytic solution between exterior members. The stacked electrode assembly has a positive electrode, a negative electrode and a separator for preventing a short circuit between the positive and negative electrodes. For example, aluminum laminate sheets are usable as the exterior members. Outer peripheral portions of the aluminum laminate sheets are sealed by fusion bonding to form a battery package such that the stacked electrode assembly can be accommodated in the battery package.

There is known a technique for fusion bonding an outer peripheral portion of the separator with the seal portions of the aluminum laminate sheets in order to prevent a displacement of the stacked electrode assembly in the secondary battery (see Patent Document 1).

PRIOR ART DOCUMENTS

Patent Document

Patent Document 1: Japanese Laid-Open Patent Publication No. H11-250873

SUMMARY OF THE INVENTION

In order to maintain the performance of the battery, it is important to contain a predetermined amount of electrolytic solution in the stacked electrode assembly. It is thus preferable to refill the stacked electrode assembly with the electrolytic solution in the case where the amount of the electrolytic solution in the stacked electrode assembly becomes insufficient due to some reason.

In the non-aqueous electrolyte secondary battery of Patent Document 1 in which the outer peripheral portion of the separator is joined with the exterior members, however, any consideration is not given to the refilling of the stacked electrode assembly with the electrolytic solution. This may result in a deterioration of battery performance during long-term use.

For the purpose of prevention of battery performance deterioration in the secondary battery in which the outer peripheral portion of the separator is joined with the exterior member such as aluminum laminate sheets, it is also desirable to take measures to prevent the outer peripheral portion of the separator from being broken from the joint part. Any measures against such breakage are not however taken in the non-aqueous electrolyte secondary battery of Patent Document 1. This makes it difficult to increase the operation life of the battery.

The present invention has been made to solve the above prior art problems. It is accordingly an object of the present invention to provide a secondary battery in which a separator of a stacked electrode assembly is joined at an outer peripheral portion thereof between exterior members so as to allow refilling of the stacked electrode assembly with an electrolytic solution, favorably prevent the separator from being broken from its joint part and thereby maintain battery performance during long-term use.

In order to achieve the above object, there is provided according to the present invention a secondary battery, comprising: a stacked electrode assembly having a positive electrode, a negative electrode and a separator; an electrolytic solution; and exterior members accommodating therebetween the stacked electrode assembly together with the electrolytic solution, wherein the secondary battery comprises: a plurality of joint parts at which an outer peripheral portion of the separator is joined with the exterior members; and a holding part formed at least between the joint parts so as to hold therein the electrolytic solution; and wherein a sum of perimeters of the joint parts is longer than a perimeter of a rectangle of minimum area enclosing therein all of the joint parts.

In the present invention, the outer peripheral portion of the separator is joined with the exterior members by forming a plurality of separate joint parts, rather than by forming a continuous single joint part, while forming the holding part at least between the joint parts to hold therein the electrolyte solution. In this configuration, the stacked electrode assembly can be refilled with the electrolyte solution from the holding part between the joint parts. Further, the sum of the perimeters of the joint parts is made longer than the perimeter of the rectangle of minimum area enclosing therein all of the joint parts so that, even though the separator becomes smaller in thickness at the joint parts, the occurrence of breakage in the joint parts can be prevented by improvement in strength against tensile force in the present invention. It is therefore possible to maintain the performance of the secondary battery during long-term use.

DESCRIPTION OF EMBODIMENTS

Figure 1:
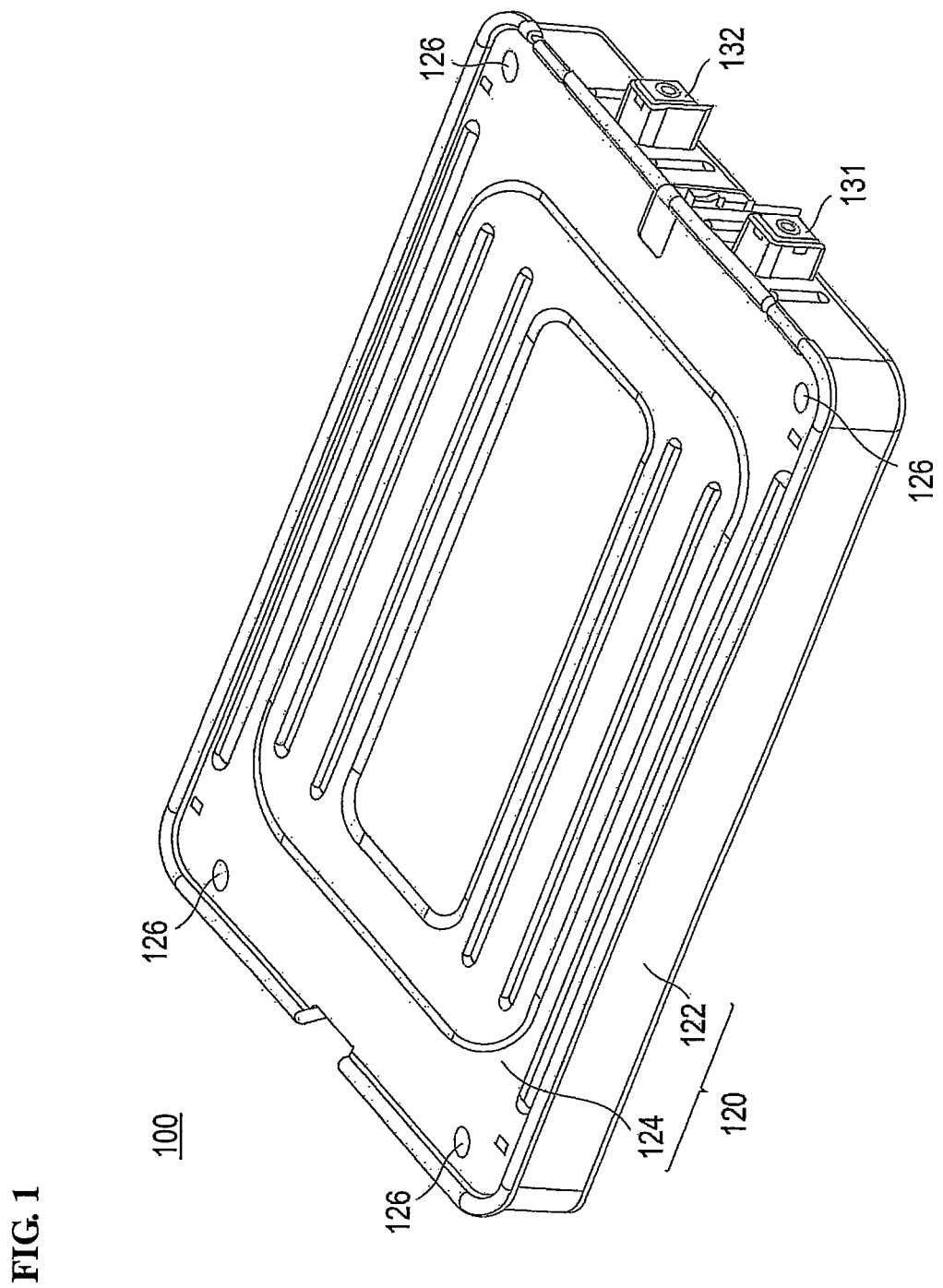
FIG. 1 is a perspective view of a battery module according to one exemplary embodiment of the present invention.

Hereinafter, exemplary embodiments of the present invention will be described below with reference to the drawings. It is noted that: in the drawings, like parts and portions are designated by like reference numerals to omit repeated explanations thereof; and the dimensions of the respective parts and portions may be exaggerated for purposes of illustration and may be different from the actual dimensions. Further, x-axis and y-axis indicate the lateral and longitudinal of flat battery 10, respectively, in the drawings.

Figure 2:
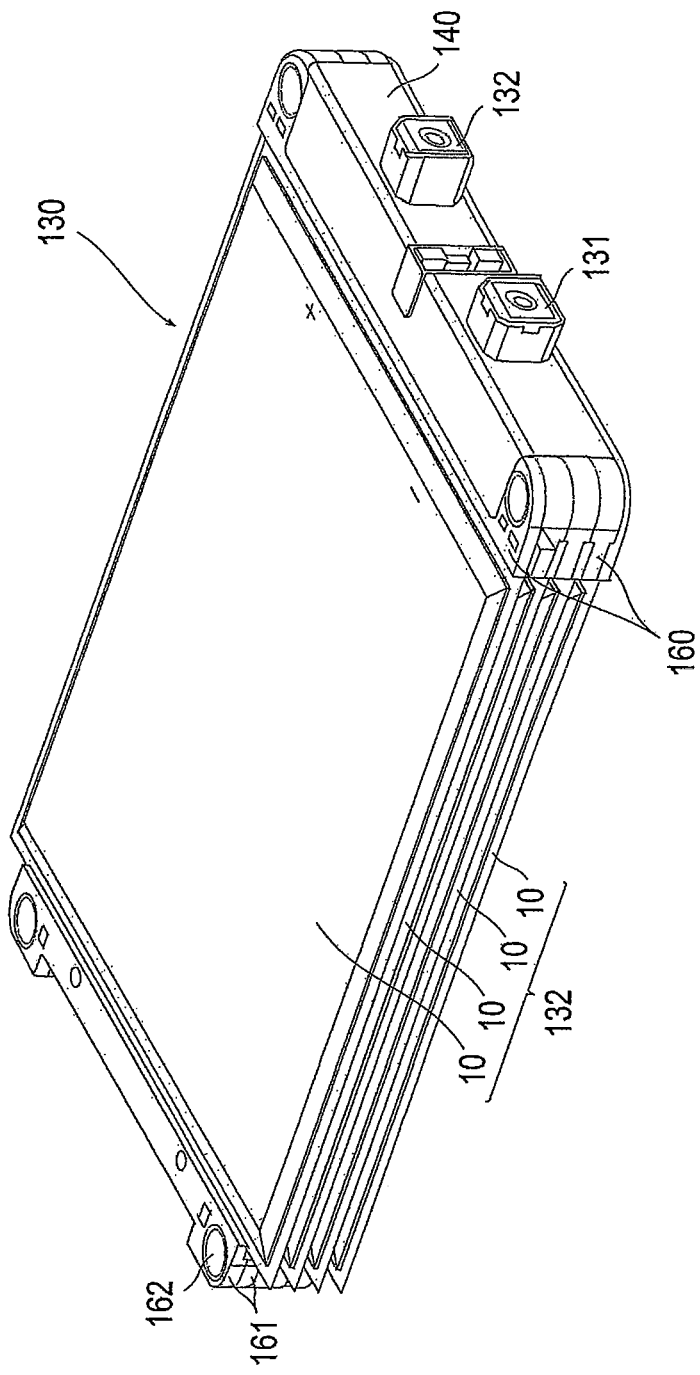
FIG. 2 is a perspective view of a cell unit in the battery module of FIG. 1.

As shown in FIGS. 1 and 2, battery module 100 includes cell unit 130 formed with a plurality of flat batteries 10 (as secondary batteries), insulating cover 140 having electrical insulating properties and case 120 accommodating therein cell unit 130 and insulating cover 140. Although battery module 100 can be used solely, it is feasible to provide an assembled battery with desired current, voltage and capacity characteristics by series and/or parallel connection of a plurality of battery modules 100.

Case 120 has rectangular box-shaped lower case member 122 and lid-shaped upper case member 124. An edge portion of upper case member 124 is wound around and fixed by crimping to an edge portion of a peripheral wall of lower case member 122. Each of lower case member 122 and upper case member 124 is formed from a relatively thin steel plate or aluminum plate. Lower case member 122 and upper case member 124 have through holes 126 formed in respective four corner portions thereof such that stacked battery modules 100 can be maintained as the assembled battery by insertion of bolts (not shown) in through holes 126. Herein, reference numerals 131 and 132 designate output terminals arranged to protrude from front opening portions of lower case member 122.

As shown in FIG. 2, cell unit 130 has stacked body 132 in which a plurality of flat batteries 10 are electrically connected together and a plurality of spacers 160 and 161 supporting the batteries. Each of spacers 160 and 161 has electrical insulating properties. Spacers 160 are arranged on a front side of stacked body 132, whereas spacers 161 (as a supporting member) are arranged on a back side of stacked body 132.

Figure 3:
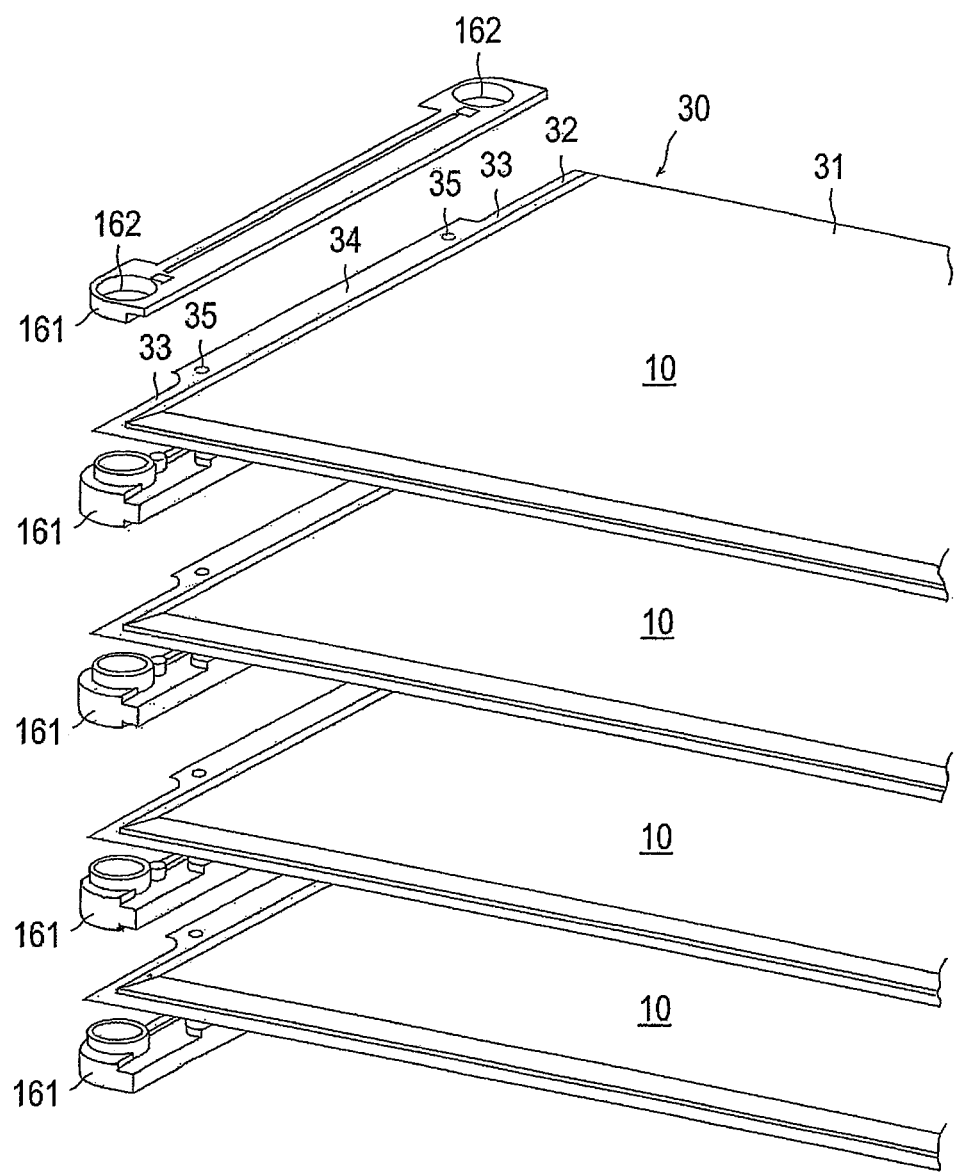
FIG. 3 is a perspective exploded view of the cell unit of FIG. 2 as viewed from the back side.

For example, spacers 161 on the back side of stacked body 132 are positioned in such a manner to hold outer peripheral portions 32 of exterior members 30 of flat batteries 10 as shown in FIG. 3. Spacers 161 have through holes 162 formed in longitudinally opposite end portions thereof such that through holes 162 can be aligned with through holes 126 on the back side of lower case member 122 and upper case member 124.

Figure 4:
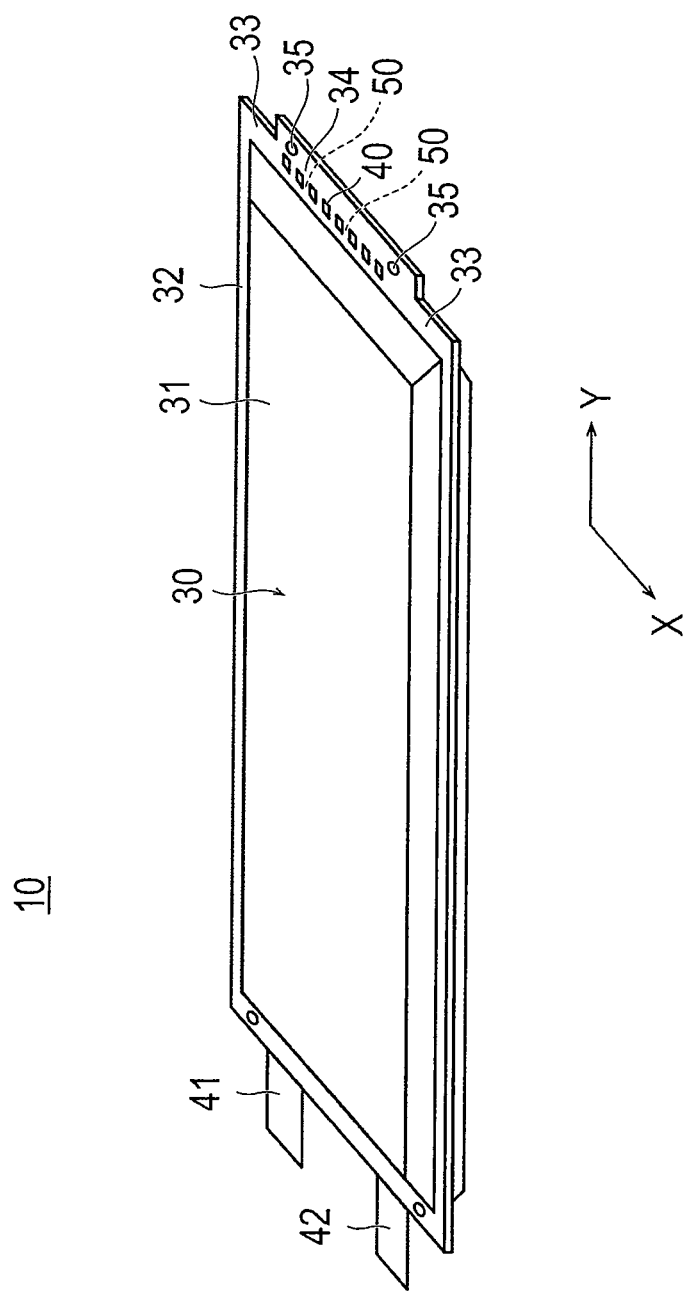
FIG. 4 is a perspective view of a flat battery according to one exemplary embodiment of the present invention.
Figure 5:
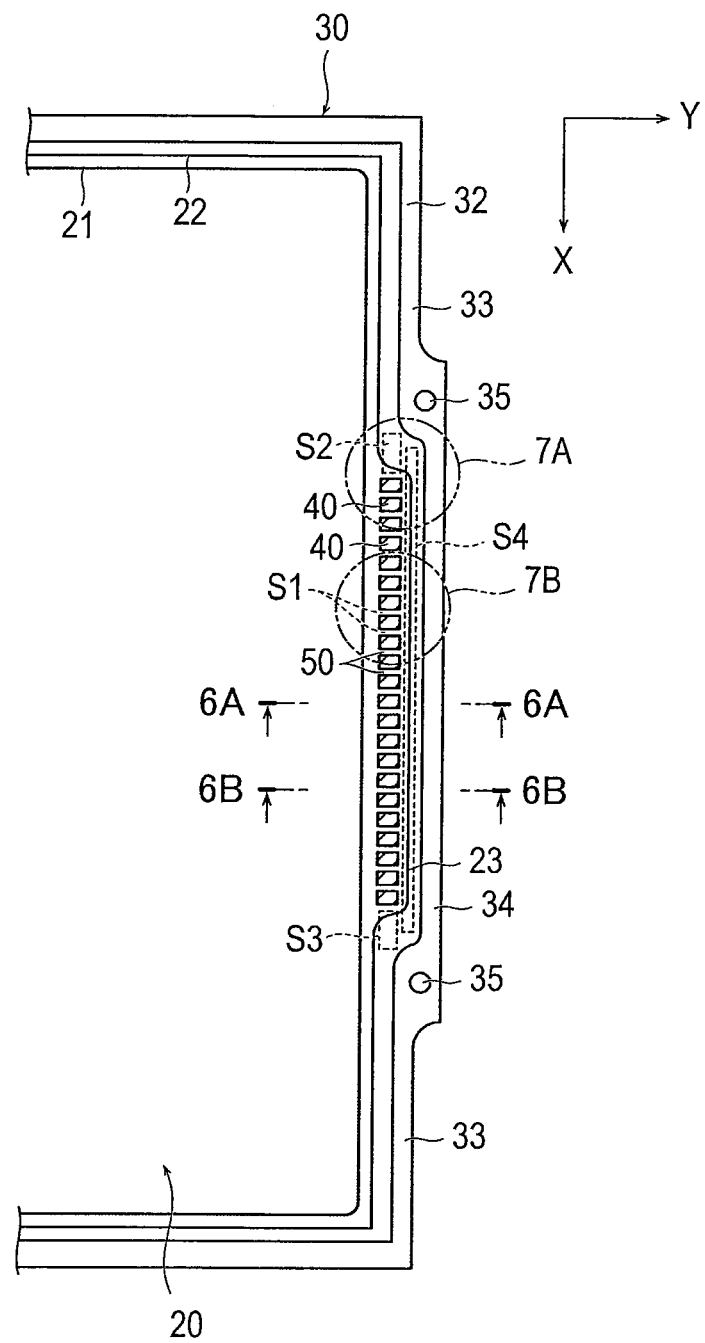
FIG. 5 is a plan view of substantial part of the flat battery, showing joint parts at which the outer peripheral portion of a separator is joined with exterior members, according to one embodiment of the present invention.
Figure 6:
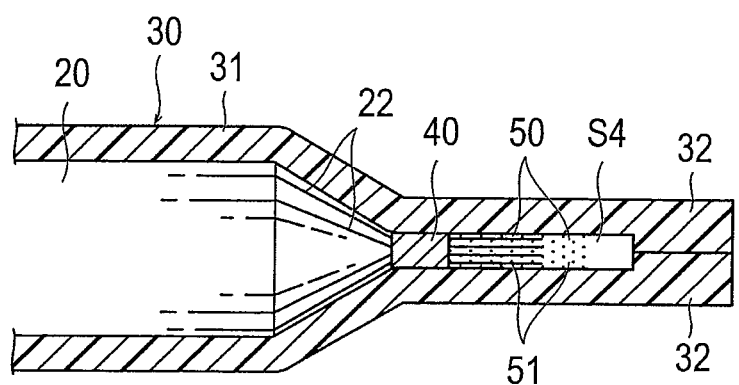
FIG. 6A is a section view taken along line 6A-6A of FIG. 5.
FIG. 6B is a section view taken along line 6B-6B of FIG. 5.
Figure 6:
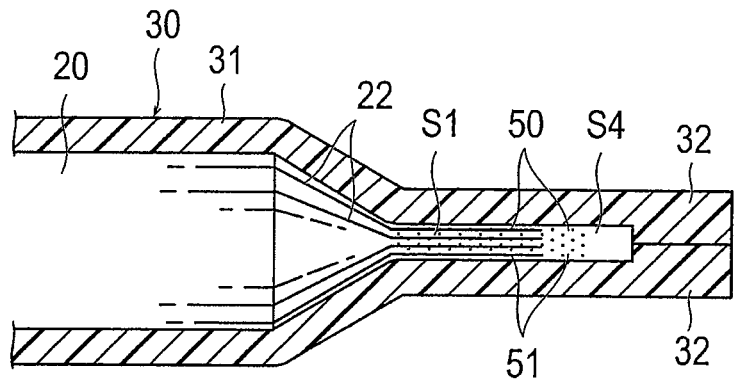

As shown in FIGS. 4 to 7, flat battery 10 is configured as e.g. a lithium-ion secondary battery and has a structure that stacked electrode assembly 20 is accommodated together with an electrolytic solution between exterior members 30. Flat battery 10 includes electrodes 41 and 42 (referred to as "tabs") let to the outside from exterior members 30. In FIG. 5, reference numeral 21 designates a positive electrode or a negative electrode. For purposes of clarity, only separators 22 are illustrated in FIG. 6.

Stacked electrode assembly 20 includes a positive electrode or electrodes, a negative electrode or electrodes and a separator or separators 22 stacked alternately together. The positive electrode has a positive electrode active material layer formed of e.g. a lithium-transition metal composite oxide such as $LiMn_2O_4$, whereas the negative electrode has a negative electrode active material layer formed of e.g. a carbon material and a lithium-transition metal composite oxide. Separator 22 is formed of e.g. porous PE (polyethylene) having permeability to allow permeation of an electrolyte material.

In terms of weight reduction and thermal conduction, exterior members 30 are formed from sheets of e.g. polymer-metal laminate film in which a metal (or alloy) such as aluminum, stainless steel, nickel or cupper is coated with an insulating material such as propylene film. Each of exterior members 30 includes body portion 31 covering stacked electrode assembly 20 and outer peripheral portion 32 extending along peripheral edge of body portion 31. Outer peripheral portions 32 are joined at part or the whole thereof by fusion bonding.

Tabs 41 and 42 are adapted to take an electric current out of stacked electrode assembly 20 and arranged to extend on a front side of flat battery 10.

Figure 7:
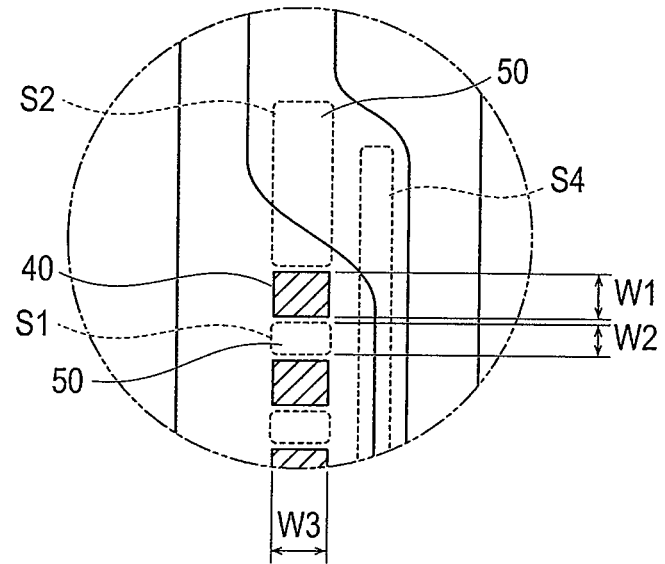
FIG. 7A is an enlarged view of an area enclosed by broken line 7A in FIG. 5.
FIG. 7B is an enlarged view of an area enclosed by broken line 7B in FIG. 5.
Figure 7:
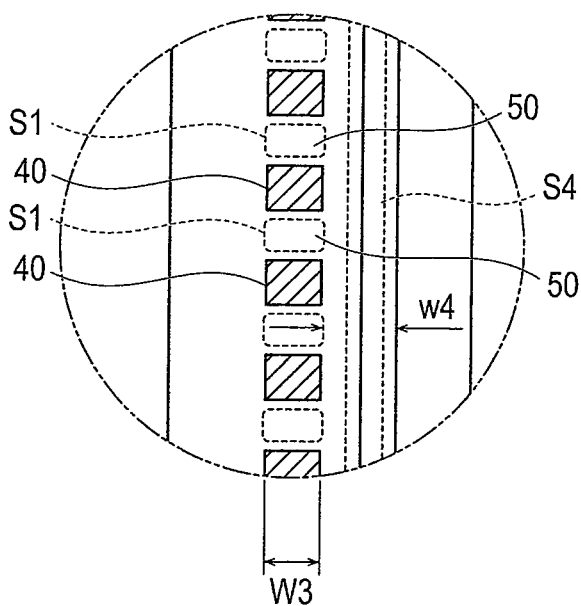
Figure 8:
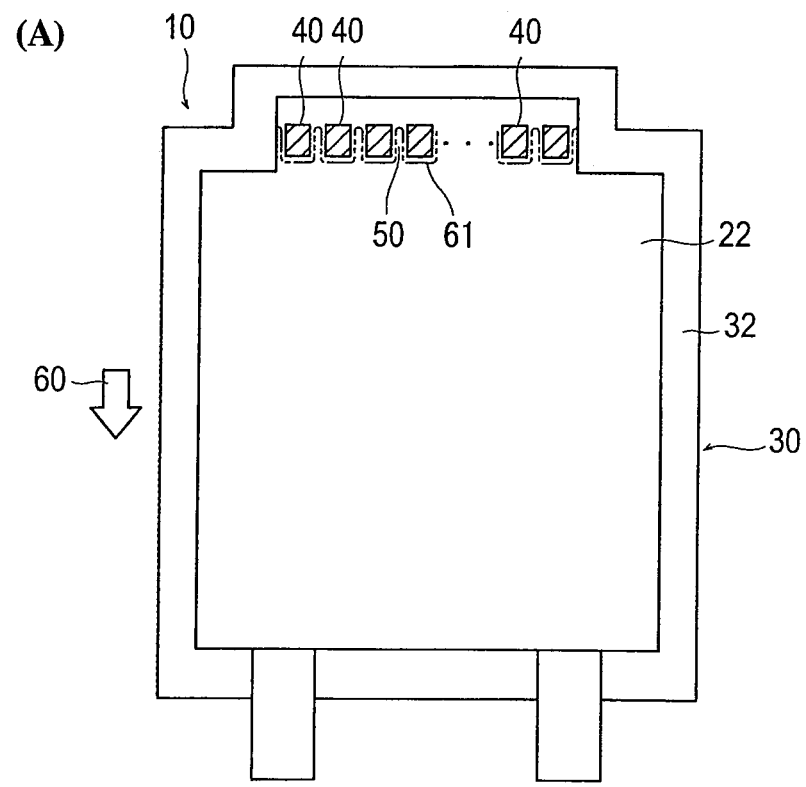
FIGS. 8A and 8B are schematic views showing how a tensile force acts on the flat battery in a direction of outline arrow.
Figure 8:
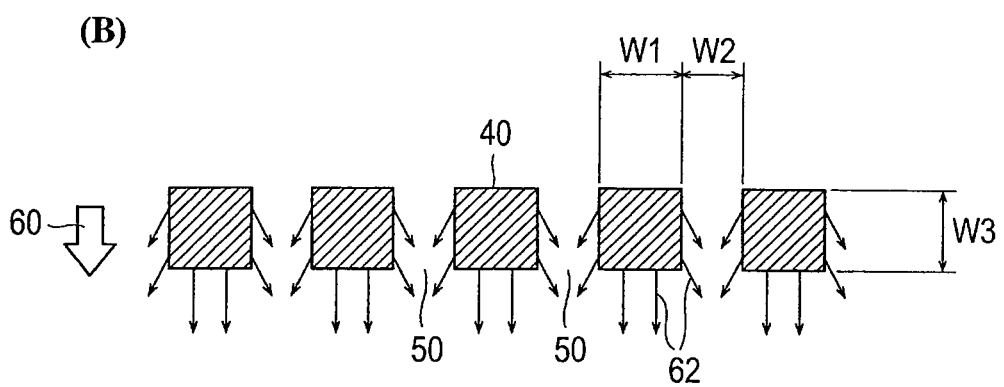

Flat battery 10 has a plurality of joint parts 40 at which outer peripheral portions of separators 22 are joined with exterior members 30 in order to prevent a displacement of stacked electrode assembly 20. Flat battery 10 further includes holding part 50 formed at least between joint parts 40 to hold therein the electrolytic solution in such a manner that stacked electrode assembly 20 can be refilled with the electrolytic solution. The joining can be done by thermal fusion bonding, ultrasonic fusion bonding, welding etc. In FIGS. 5, 7 and 8, joint parts 40 are indicated by hatching for ease of understanding.

More specifically, the outer peripheral portions of separators 22 are joined with the exterior members 30 by forming a plurality of separate joint parts 40 as shown in FIGS. 5, 6 and 7 rather than by forming a continuous single joint part. The continuous single joint part is hereinafter sometimes simply referred to as "continuous joint part" for the sake of simplicity.

The dimensions of joint parts 40 can be set, for example, as follows: W1 (width)=2 mm, W2 (distance)=1 mm, W3 (length)=2 mm and W4 (distance from the fused joint (joint part 40) between the outer peripheral portions of separators 22 and exterior members 30 to the fused joint between outer peripheral portions 32 of exterior members 30)=5 mm as shown in FIGS. 7(A) and (B). There is no particular limitation on the ratio of the sum of the areas of joint parts 40 to the total area of separator 22. For example, the ratio of the sum of the areas of joint parts 40 to the total area of separator 22 can be set to 0.1% to 1%.

In the case of a battery in which separators are joined between exterior members by a continuous joint part, the battery has a so-called bag structure that an electrolytic solution is accumulated and sealed in a space between the continuous joint part and the joint between outer peripheral portions of the exterior members. In such a structure, it is not possible to make effective use of the sealed electrolytic solution.

On the other hand, separators 22 are joined with the exterior member 30 by a plurality of joint parts 40 in the present embodiment. As separators 22 are not fused together in at least the region between the joint parts 40, holding parts 50 are formed in a small space between separators 22 in this region so as to hold therein electrolytic solution 51 (see FIG. 6). Stacked electrode assembly 20 can be thus refilled with electrolytic solution 51 from holding part 50 under the action of capillarity when the amount of electrolytic solution 51 in stacked electrode assembly 20 becomes insufficient due to some reason. By such refilling of stacked electrode assembly 20 with electrolytic solution 51, it is possible to maintain a state in which stacked electrode assembly 20 contains a predetermined amount of electrolytic solution 51 over a long period of time so that flat battery 10 can secure battery performance during long-term use.

Even when gas is accumulated between the stacked electrodes during battery manufacturing process, such accumulated gas can be easily released from the power generating portion of the battery to outer peripheral portions 32 through region S1 between joint parts 40. This makes it possible to prevent a deterioration in power generating efficiency caused by the accumulated gas.

As shown in FIGS. 5 and 7, not only region S1 between joint parts 40 but also clearance region S2 from the uppermost one of the plurality of joint parts 40 in the drawing to exterior members 30, clearance region S3 from the lowermost one of the plurality of joint parts 40 in the drawing to the exterior members 30 and clearance region S4 between the plurality of joint parts 40 and the back-side ends of exterior members 30 are adapted to serve as holding part 50. This makes it possible to hold a larger amount of electrolytic solution 51 for refilling of stacked electrode assembly 20 so that flat battery 10 can secure battery performance during longer-term use.

As shown in FIGS. 3 to 5, outer peripheral portion 32 of exterior member 30 includes a plurality of supporting parts 33 coupled by an adhesive to battery-supporting spacers 161 and extension part 34 located between supporting parts 33 and extending radially outwardly of the battery. The outer peripheral portion of separator 22 has tongue part 23 extending toward extension parts 34 of exterior members 30 such that joint parts 40 are formed on tongue part 23. This makes it possible to make effective use of the dead space that is supported by spacers 161 and does not substantially contribute to power generation, increase the hold amount of electrolytic solution 51 and improve the operation lifetime of the battery.

Through holes 35 are formed in extension parts 34 such that pins in spacers 161 can be inserted in through holes 35 so as to restrict the supporting position of flat battery 10 relative to spacers 161.

In FIG. 8(A), schematically indicated by a two-dot chain line is breakage line 61 that could be developed at or around joint parts 40 when a tensile force acts on separator 22 in the direction of outline arrow 60. Under such a tensile force, a tensile stress is exerted on each of joint parts 40 in the directions of solid-line arrows 62 as schematically indicated in FIG. 8(B).

When the tensile stress is excessively exerted on each joint part 40 in the directions of solid-line arrows 62 in FIG. 8(B), there occurs breakage in separator 22 etc. along breakage line 61 in FIG. 8(A). As breakage line 61 extends along the periphery (three sides) of each of joint parts 40, the battery is made able to withstand a larger tensile stress by increasing the sum of the perimeters of joint parts 40.

It is thus preferable to increase the number of joint parts 40 and to increase the sum of the perimeters of joint parts 40 as shown in FIG. 5 in the case where a larger tensile stress acts on each joint part 40.

Figure 9:
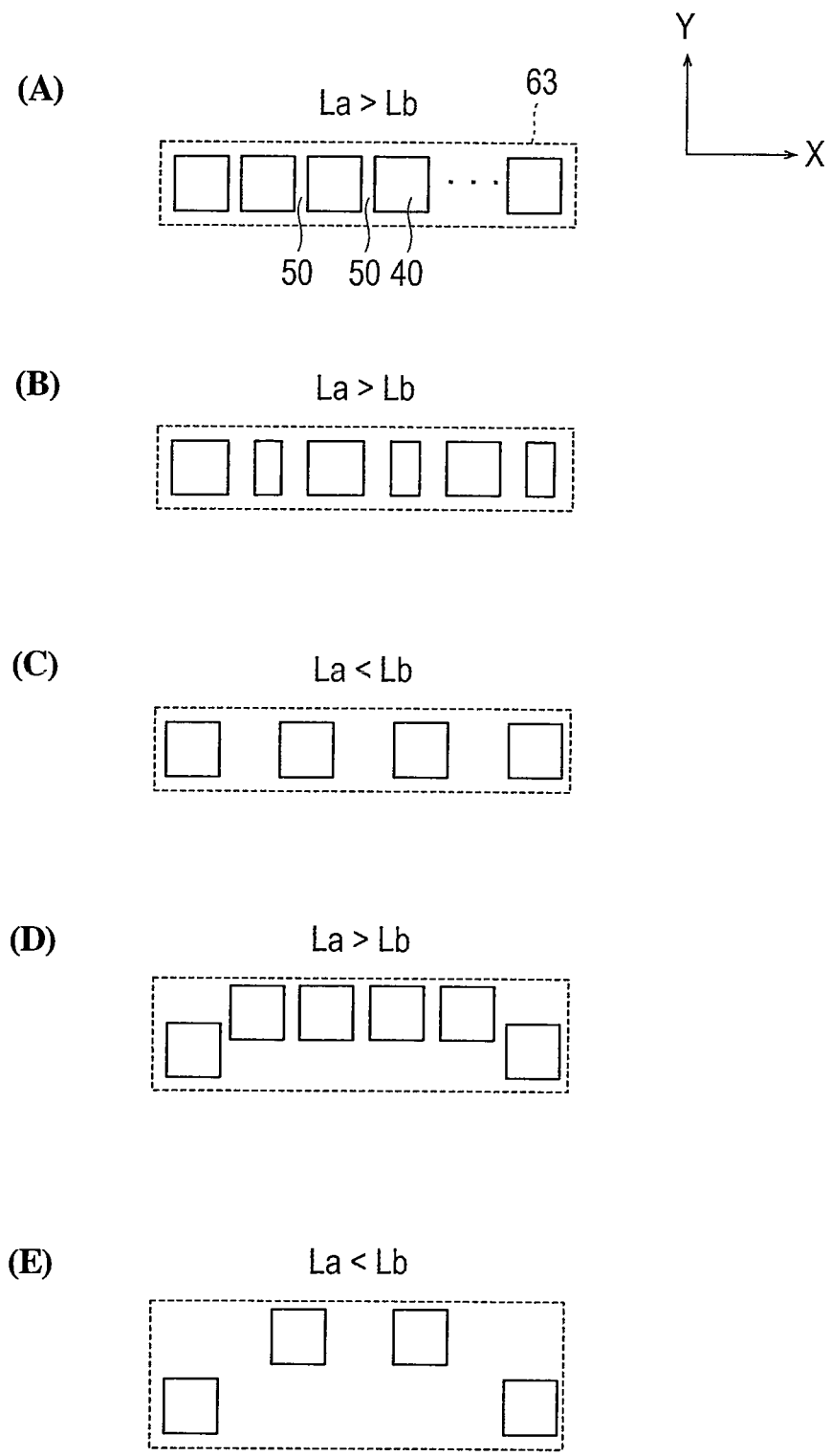
FIGS. 9A to 9E are schematic view showing examples of the shape and arrangement of a plurality of joint parts and the relationship of the sum (La) of the perimeters of the joint parts and the perimeter (Lb) of a rectangle of minimum area encompassing all of the joint parts.
Figure 10:
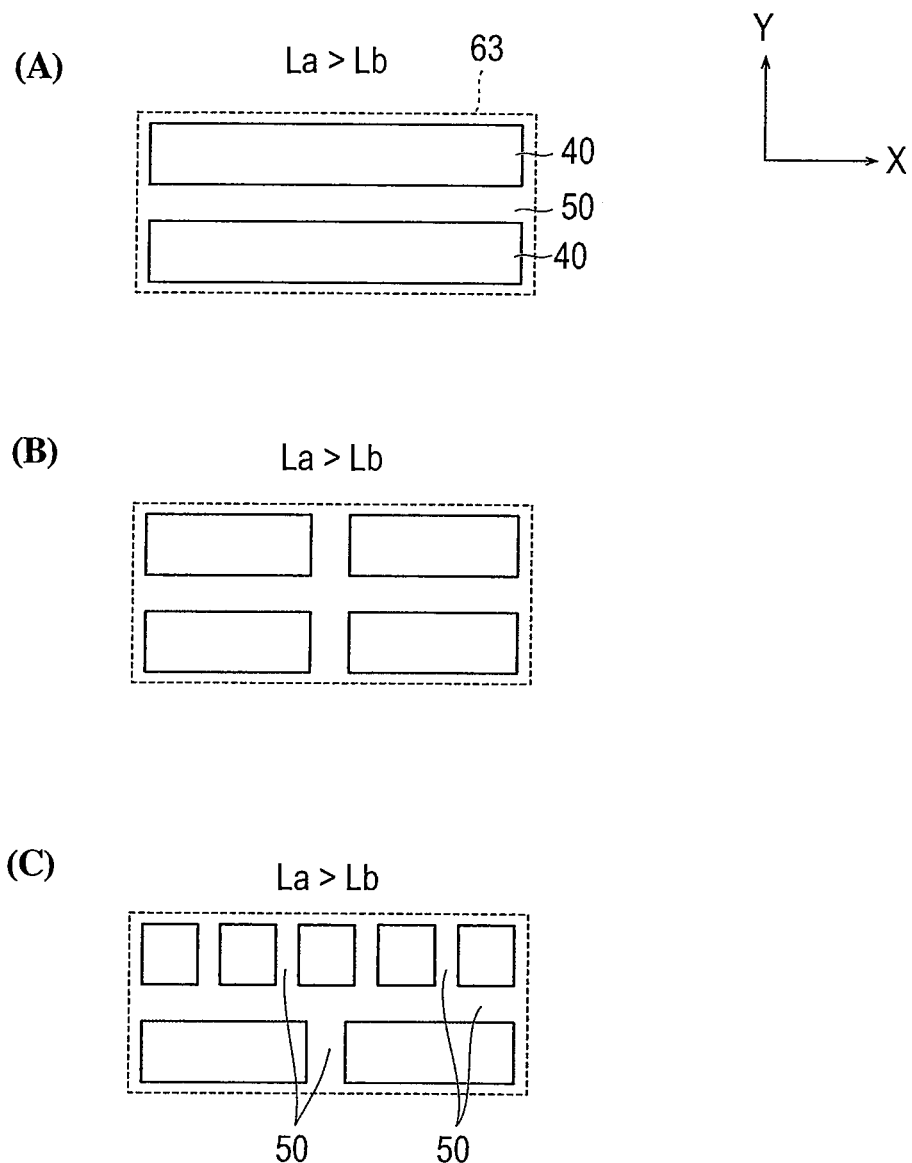
FIGS. 10A to 10C are schematic view showing examples of the shape and arrangement of a plurality of joint parts and the relationship of the sum (La) of the perimeters of the joint parts and the perimeter (Lb) of a rectangle of minimum area encompassing all of the joint parts.

In particular, the sum (La) of the perimeters of joint parts 40 is preferably made longer than the perimeter (Lb) of rectangle 63 of minimum area enclosing therein all of joint parts 40. The configuration of rectangle 63 can be defined as indicated by a broken line in FIGS. 9 and 10. By satisfaction of such a condition, separator 22 can attain an improved strength against tensile force during use of flat battery 10 in a vehicle such as automotive vehicle where vibrations occur during running. This makes it possible to prevent the occurrence of breakage in joint parts 40 at which separator 22 is made thinner.

Herein, examples of the shape and arrangement of a plurality of joint parts 40 and the relationship of La and Lb are schematically shown in FIGS. 9(A) to (E) and FIGS. 10(A) to (C).

In FIG. 5 and FIGS. 9(A) and (C), joint parts 40 are all made the same in size and aligned in a line in the x-axis direction. The relationship of La and Lb is either La<Lb (FIG. 9(C)) or La>Lb (FIG. 5 and FIG. 9(A)). The present invention is not limited to this example.

It is feasible to align joint parts 40 of different sizes in a line in the x-axis direction as shown in FIG. 9(B). The condition of La>Lb is satisfied in this example.

As shown in FIGS. 9(D) and (E), it is feasible to displace any one or ones of joint parts 40 relative to the other joint parts 40 in the y-axis direction rather than to arrange joint parts 40 in a line in the x-axis direction. The relationship of La and Lb is La>Lb (FIG. 9(D)) or La<Lb (FIG. 9(E)).

Further, joint parts 40 may be formed along the x-axis direction and arranged in two columns in the y-axis direction as shown in FIG. 10(A). The condition of La>Lb is satisfied in this example. Even in such an arrangement, holding part 50 can be formed so as to hold therein electrolytic solution 51 and refill stacked electrode assembly 20 with electrolytic solution 51 as long as there are some spaces left at least between joint parts 40 in the vertical direction of the drawing.

As shown in FIG. 10(B), joint parts 40 may be arranged in two rows in the x-axis direction and in two columns in the y-axis direction. In this example, the condition of La>Lb is satisfied.

As shown in FIG. 10(C), joint parts 40 may be arranged in two columns in the y-axis direction with five joint parts 40 aligned in the x-axis direction in the upper column. The condition of La>Lb is satisfied in this example. The position of space between joint parts 40 in the upper column are displaced in the x-axis direction from the position of space between joint parts 40 in the lower column. Even in such an arrangement, holding part 50 can be formed so as to hold there in electrolytic solution 51 and refill stacked electrode assembly 20 with electrolytic solution 51.

The arrangement of joint parts 40 is not limited to the direction parallel to the x-axis or y-axis direction. Although not shown in the drawings, it is feasible to arrange joint parts 40 in any direction inclined relative to the x-axis or y-axis direction.

As described above, flat battery 10 according to the present embodiment has joint parts 40 at which the outer periphery of separator 22 is joined with exterior members 30 and holding part 50 formed at least between joint parts 40 so as to hold therein electrolytic solution 51 and refill stacked electrode assembly 20 with electrolytic solution 51. It is therefore possible to maintain the state in which stacked electrode assembly 20 contains a predetermined amount of electrolytic solution 51 over a long period of time by refilling stacked electrode assembly 20 with electrolytic solution 51 from holding part 50 between joint parts 40, whereby the secondary battery can secure battery performance during long-term use. Further, it is easier to release the gas accumulated between the stacked electrodes to outer peripheral portions 32 through the region between joint parts 40 and is possible to prevent a deterioration in power generating efficiency caused by the accumulated gas. It is furthermore possible to improve the strength of separator 22 against tensile strength and prevent the occurrence of breakage in joint parts 40 in which separator 22 is made smaller in thickness by controlling the sum (La) of the perimeters of joint parts 40 to be longer than the perimeter of rectangle 63 of minimum area enclosing therein all of joint parts 40.

As each of outer peripheral portions 32 of exterior members 30 has a plurality of supporting parts 33 coupled to battery-supporting spacers 161 and extension part 34 located between supporting parts 33 and extending radially outwardly of the battery; and as the outer peripheral portion of separator 22 has tongue part 23 extending to between extension parts 34 of exterior members 30 such that joint parts 40 are formed on tongue part 23, it possible to make effective use of the dead space that is supported by spacers 161 and does not substantially contribute to power generation, increase the hold amount of electrolytic solution 51 and improve the operation lifetime of the battery.

Another Embodiment

Next, a flat battery according to another embodiment of the present invention will be explained below.

Figure 11:
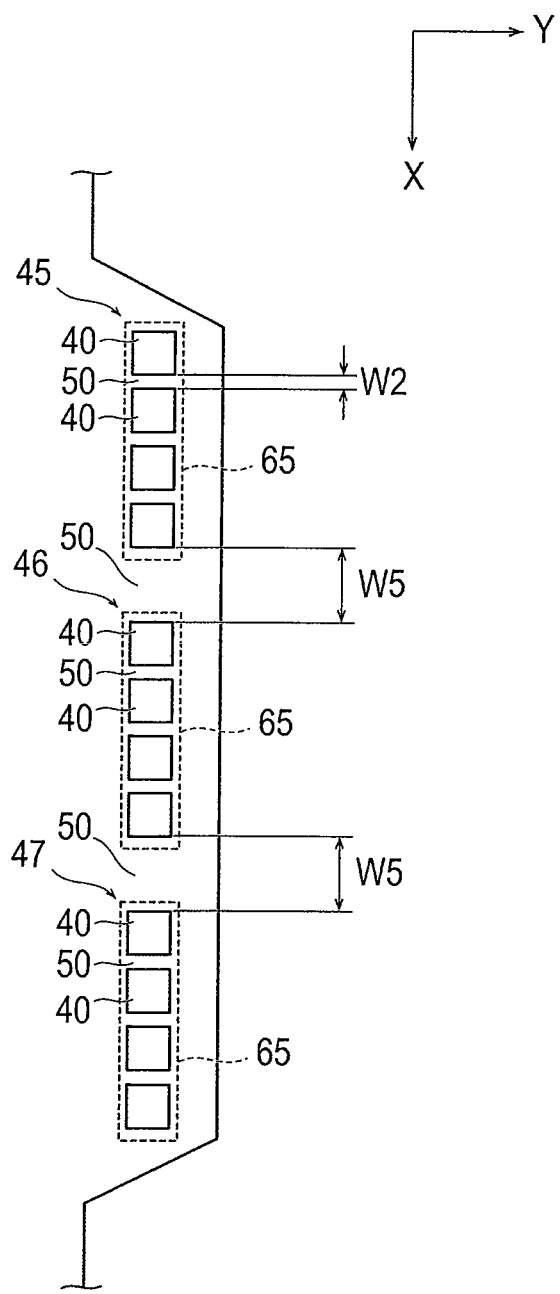
FIG. 11 is a plan view of substantial part of a flat battery, showing joint parts, according to another exemplary embodiment of the present invention.

In general, flat battery 10 according to the present another embodiment includes a plurality of joint parts 40 at which outer peripheral portions of separators 22 are each joined with exterior members 30 and holding part 50 formed between joint parts 40 as shown in FIG. 11. Joint parts 40 are arranged in joint regions 45, 46 and 47. In each of joint regions 45, 46 and 47, joint parts 40 are arranged adjacent to and at distance W2 away from each other. One joint region 44 is located at a distance that is longer than distance W2 away from the other joint region 46, 47. In each of joint regions 45, 46 and 47, the sum of the perimeters of joint parts 40 is made longer than the perimeter of rectangle 65 of minimum area enclosing therein all of adjacent joint parts 40.

In the above-mentioned embodiment, attention is focused on the relationship between all of joint parts 40 of flat battery 10 and rectangle 63 of minimum area enclosing all these joint parts 40 so as to prevent breakage in joint parts 40 by satisfaction of La>Lb. By contrast, attention is focused on each joint region 45, 46, 47 constituted by adjacent joint parts 40 for improvement in joint strength in the present embodiment.

As shown in FIG. 11, the plurality of joint regions 45, 46 and 47 are provided on flat battery 10. Each of joint regions 45, 46 and 47 is defined as the region in which the plurality of joint parts 40 are arranged adjacent to each other. These joint regions 45, 46 and 47 are located at distance W5 from each other. Distance W5 is longer than distance W2 between adjacent joint parts 40. Holding portion 50 is formed between joint parts 40 and between joint regions 45, 46 and 47.

In one joint region 45, joint parts 40 are formed so as to satisfy the condition of La (the sum of the perimeters of adjacent joint parts 40)>Lc (the perimeter of rectangle 65 of minimum area enclosing therein adjacent joint parts 40). This allows improvement in the tensile strength in joint region 45 as compared to the case forming a continuous joint in the region corresponding to joint region 45. As in the case of joint region 45, joint parts 40 are formed so as to satisfy the condition of La>Lc in each of the other joint regions 46 and 47. This also allows improvement in the tensile strength in each of joint regions 46 and 47. The tensile strength of separator 22 can be improved throughout flat battery 10 by improving the tensile strength in each joint region 45, 46, 47.

As described above, it is possible according to the present another embodiment to refill the stacked electrode assembly with electrolytic solution 51 from holding part 50 and prevent breakage in joint parts 40, whereby the secondary battery can secure battery performance during long-term use.

Although one joint region is constituted by four adjacent joint parts in the present another embodiment, the number of joint parts in one joint region is not particularly limited and can be adjusted as appropriate. The number of joint regions in one flat battery is not also particularly limited and can be adjusted as appropriate although three joint regions are provided in one flat battery in the present another embodiment.

Modifications

The present invention is not limited to the above embodiments. Various changes and modifications are possible within the scope of the present invention. Although both of positive and negative tabs 41 and 42 are provided on one side of exterior member 30 in flat battery 20 in the above embodiment, the present invention is applicable to the secondary battery in which positive and negative tabs are provided on different sides. It is alternatively feasible to provide holding part 50 and tabs on the same side.

Examples

Examples of flat battery 10 with a plurality of joint parts 40 will be next described below. It is herein noted that the secondary battery according to the present invention is not limited to the following examples.

The operation conditions of Examples and Comparative Example are indicated in TABLE 1.

TABLE 1

|  | Width W1 (mm) | Length W3 (mm) | Distance W2 (mm) | Number of fused joints | Fused joint area (mm$^2$) | Perimeter (mm) | Fused joint strength (N) |
|---|---|---|---|---|---|---|---|
| Example 1 | 2 | 2 | 1 | 6 | 24 | 48 | 210 |
| Example 2 | 1 | 1 | 1 | 12 | 12 | 48 | 212 |

TABLE 1-continued

| | Width W1 (mm) | Length W3 (mm) | Distance W2 (mm) | Number of fused joints | Fused joint area (mm²) | Perimeter (mm) | Fused joint strength (N) |
|---|---|---|---|---|---|---|---|
| Comparative Example | 12 | 2 | 0 | 1 | 24 | 28 | 128 |

In each of Examples 1 and 2, flat battery 10 was provided to satisfy the condition: the sum of the perimeters of the fused joints (joint parts 40) (La)>the perimeter of rectangle 63 of minimum area enclosing all of fused joints 40. The fused joints of Example 1 and the fused joints of Example 2 are respectively schematically shown in FIGS. 12(A) and 12(B).

Examples 1 and 2 were different from each other in terms of the size of fused joints 40, the distance between fused joints 40 and the number of fused joints 40. The total area of fused joints 40 was made larger in Example 1 than in Example 2. In each of Examples 1 and 2, holding part 50 was formed between the plurality of fused joints 40.

Figure 12:
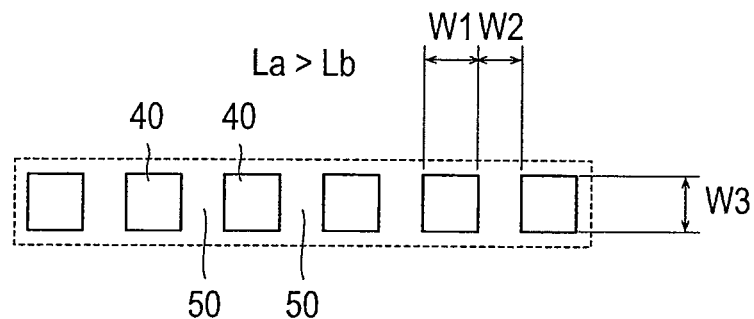
FIG. 12 is schematic views of joint parts formed in Examples and Comparative Example.
Figure 12:
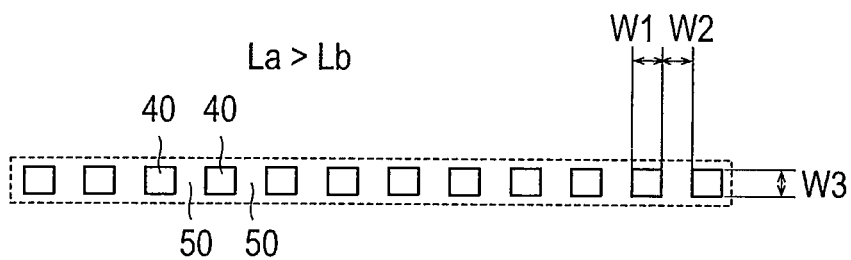
Figure 12:
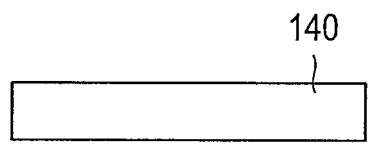

In Comparative Example, a conventional flat battery with continuous fused joint 140 was provided (the number of fused joints was 1). In FIG. 12(C), fused joint 140 of Comparative Example is shown. The total area of fused joint 140 was the same as that of Example 2.

Flat batteries 10 of Examples 1 and 2 had a higher level of fused joint strength than that of the conventional flat battery of Comparative Example as is seen from TABLE 1. As is seen from comparison of Example 1 and Comparative Example, flat battery 10 of Example 1 had a higher fused joint strength than that of Comparative Example even though there was no difference in the total area of the fused joints. It has thus been shown by the above results that flat battery 10 according to the present invention can ensure improved strength against tensile force applied to fused joints 40 as compared to the conventional flat battery.

The invention claimed is:

1. A secondary battery, comprising:
   a stacked electrode assembly having a positive electrode, a negative electrode and a separator;
   an electrolytic solution, the separator having permeability to the electrolytic solution;
   exterior members accommodating therebetween the stacked electrode assembly together with the electrolytic solution; and
   electrode terminals connected to the stacked electrode assembly and led to the outside from the exterior members so as to take an electric current out of the stacked electrode assembly,
   wherein the exterior members have respective outer peripheral portions with peripheral edges thereof directly sealed to each other; and
   wherein the secondary battery further comprises:
   a plurality of joint parts formed between inner areas of the outer peripheral portions of the exterior members and aligned in a first direction parallel to the respective peripheral edges on one peripheral side of the exterior members, with first clearance regions respectively disposed between the joint parts and a second clearance region disposed between the respective joint parts and the respective peripheral edges of the exterior members, such that the inner areas of the outer peripheral portions of the exterior members are joined to each other by the joint parts, and such that an outer peripheral portion of the separator is joined to the inner areas of the outer peripheral portions of the exterior members by the joint parts, the first clearance regions being aligned along the first direction, the second clearance region extending along the first direction in outer areas of the outer peripheral portions of the exterior members and being beyond the first clearance regions in a second direction perpendicular to the first direction; and
   an electrolyte holding part formed in the first and second clearance regions so as to hold therein the electrolytic solution.

2. A secondary battery, comprising:
   a stacked electrode assembly having a positive electrode, a negative electrode and a separator;
   an electrolytic solution; and
   exterior members accommodating therebetween the stacked electrode assembly together with the electrolytic solution and having respective outer peripheral portions with peripheral edges thereof directly sealed to each other,
   wherein the secondary battery further comprises:
   a plurality of joint parts formed between the outer peripheral portions of the exterior members and aligned in a first direction parallel to the respective peripheral edges on one peripheral side of the exterior members, with first clearance regions respectively disposed between the joint parts and a second clearance region disposed between the respective joint parts and the respective peripheral edges of the exterior members, such that an outer peripheral portion of the separator is joined to the outer peripheral portions of the exterior members by the joint parts, the first clearance regions being aligned along the first direction, the second clearance region extending along the first direction in outer areas of the outer peripheral portions of the exterior members and being beyond the first clearance regions in a second direction perpendicular to the first direction; and
   an electrolyte holding part formed in the first and second clearance regions so as to hold therein the electrolytic solution,
   wherein each of the outer peripheral portions of the exterior members includes a plurality of supporting parts coupled to a supporting member of the battery and an extension part located between the supporting parts and extending outwardly of the battery; and
   wherein the outer peripheral portion of the separator includes a tongue part extending to the extension parts of the exterior members and on which the joint parts are formed.

3. The secondary battery of claim 1, wherein a sum La of perimeters of the plurality of joint parts is larger than a perimeter Lb of a rectangle of minimum area enclosing the plurality of joint parts.

4. The secondary battery of claim 2, wherein a sum La of perimeters of the plurality of joint parts is larger than a perimeter Lb of a rectangle of minimum area enclosing the plurality of joint parts.

* * * * *